Figure 1:
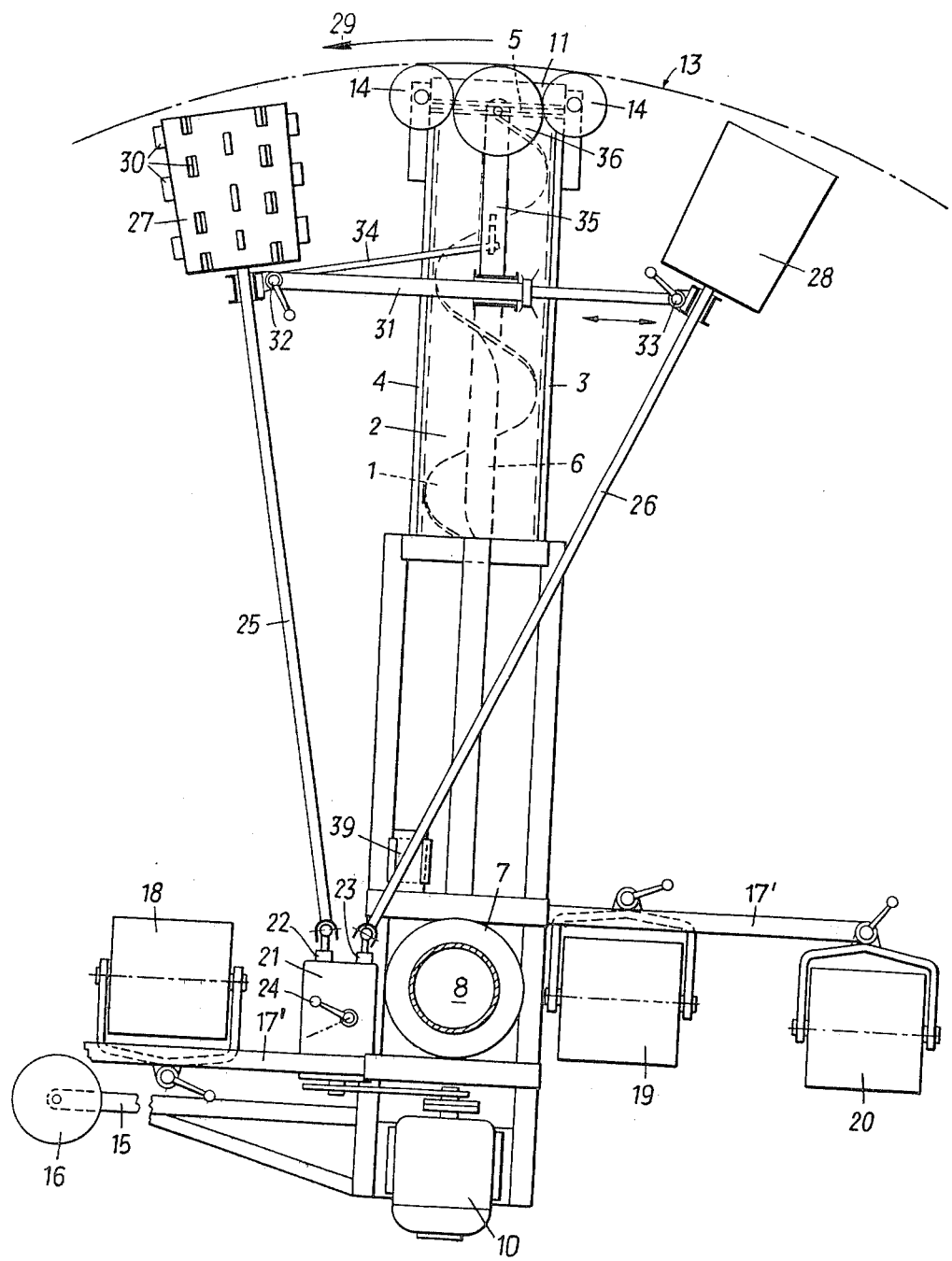

United States Patent [19]

Wolf

[11] 4,245,933
[45] Jan. 20, 1981

[54] SILO INSTALLATION AND APPARATUS FOR LOADING AND UNLOADING A SILO

[75] Inventor: Johann Wolf, Scharnstein, Austria

[73] Assignee: Johann Wolf Gesellschaft m.b.H. KG., Scharnstein, Austria

[21] Appl. No.: 11,163

[22] Filed: Feb. 9, 1979

[30] Foreign Application Priority Data

Feb. 21, 1978 [AT] Austria .................................. 1235/78

[51] Int. Cl.³ ............................................ B65G 53/08
[52] U.S. Cl. ..................................... 406/56; 406/109; 406/114; 406/173
[58] Field of Search ..................... 406/53, 56, 57, 109, 406/114, 164, 165, 167, 173; 414/298

[56] References Cited

U.S. PATENT DOCUMENTS

| 954,944 | 4/1910 | Dunn | 406/56 |
|---|---|---|---|
| 2,474,205 | 6/1949 | Welty | 406/168 X |
| 2,518,601 | 8/1950 | Cordis | 414/298 |
| 2,671,696 | 3/1954 | McLean | 406/57 |
| 2,711,814 | 6/1955 | McCarthy | 198/616 |
| 3,239,279 | 3/1966 | Skromme et al. | 406/57 |
| 3,653,520 | 4/1972 | Milchner | 406/57 |
| 3,713,551 | 1/1973 | Moen | 414/298 |
| 4,159,151 | 6/1979 | Wood | 406/173 X |
| 4,170,385 | 10/1979 | Buschbom et al. | 406/114 X |

FOREIGN PATENT DOCUMENTS

| 238642 | 6/1964 | Austria . | |
| 711148 | 6/1965 | Canada | 406/114 |
| 2532785 | 2/1976 | Fed. Rep. of Germany | 406/56 |
| 403620 | 2/1974 | U.S.S.R. | 406/57 |

Primary Examiner—James L. Rowland
Attorney, Agent, or Firm—Young & Thompson

[57] ABSTRACT

A material-handling blower is associated with a conveyor duct, which has an open lower end. A horizontal conveyor screw has an inner end associated with the lower end of said duct and is angularly movable about a main vertical axis extending near said inner end. At least two backing rollers are rotatable on vertical axes and connected to said conveyor screw to move in unison therewith about said main vertical axis and are engageable with the inside peripheral surface of a silo to back said conveyor screw. Horizontal carrying arms are connected to said conveyor screw to move in unison therewith about said main vertical axis and extend from said conveyor screw on opposite sides thereof substantially at right angles to the axis of said screw. Supporting rollers are carried by and pivotally connected to said carrying arms and individually adjustable in height relative to said carrying arms and are disposed on opposite sides of said duct at different radial distances from said main vertical axis and rotatable on horizontal axes which are substantially at right angles to the axis of said conveyor screw. At least one propelling roller is provided, which is connected to said conveyor screw and rotatable on a horizontal axis to move said conveyor screw about said main vertical axis. A throwing blade is detachably and non-rotatably connected to said conveyor screw.

23 Claims, 8 Drawing Figures

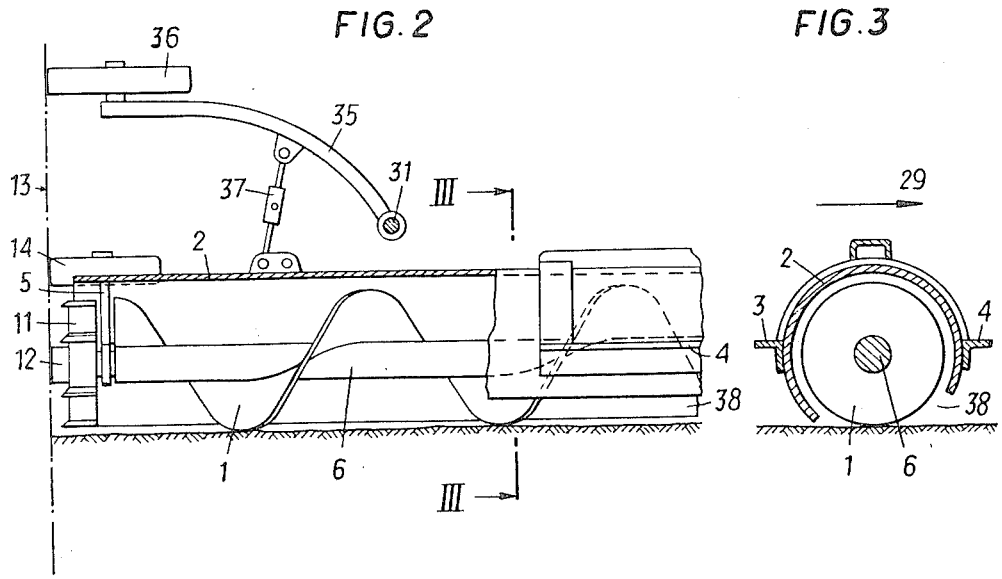
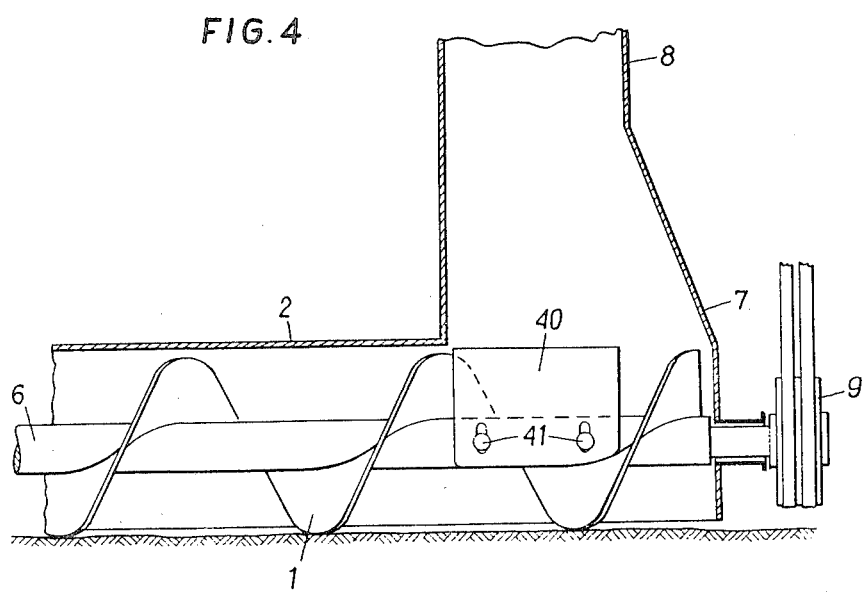

SILO INSTALLATION AND APPARATUS FOR LOADING AND UNLOADING A SILO

This invention relates to apparatus for use in loading and unloading a circular silo, comprising a conveyor screw, which is movable about the axis of the silo and is backed at the silo wall by at least two backing rollers and supported on the body of silage in the silo by vertically adjustable supporting rollers, also comprising at least one motor-driven propelling roller, a conveyor duct, which is disposed at the center of the silo and associated with the conveyor screw at the inner end thereof, which is disposed at the center of the silo, and a material-handling blower.

Known top unloaders for tower silos serve to scrape off or eject the silage and cannot be used to charge, distribute and compact material such as corn or cereal grits, dried fruit or short chopped silage corn. Neither the conventional cutting conveyor screws nor the cutting and conveying scraper chains were suitable for a uniform distribution and compaction. These operations can be carried out with an unloader only if the following requirements are fulfilled: the material must be fed centrally and must be surrounded by confining means on the silo floor at the center. In the confined space, tools must be operated to distribute the material outwardly in such a manner that it is fed outwardly in accordance with the area of the circle. Scraping means are also required to smoothen minor irregularities. Finally there must be means which act on the material that has been fed and distributed and which effect a suitable compaction.

It is an object of the invention so to design the known top unloaders having a conveyor screw and a material-handling blower that with slight alterations, which can be effected quickly and without need for special means, they can be changed to be suitable for loading a silo and for distributing and compacting silage.

This is accomplished according to the invention in that the direction of rotation of the means for driving the conveyor screw can be reversed whereas the direction of rotation of the means for driving the propelling rollers remains unchanged, a throwing blade is provided, which by screw-threaded or quickly operable connecting means is detachably and non-rotatably connected to the conveyor screw adjacent to the inner end thereof, which is disposed near the conveyor duct and the supporting rollers which roll on the silage are mounted on arms and disposed on both sides of the conveyor duct at different radial distances from the axis of rotation of the apparatus and are individually adjustable in height and have axes of rotation which are approximately at right angles to the axis of rotation of the conveyor screw.

Opened German Specification No. 2,532,785 discloses an unloader which is intended for use with horizontal silos and comprises supporting wheels that are adjusted in height and roll in the silo on the floor rather than on the body of silage. Opened German Specification No. 2,532,785 does not describe a throwing blade which is detachably connected to a conveyor screw, which at its end is provided with a rotary cutter head.

The silo is unloaded in known manner in that the conveyor screw separates the granular material from the packed silage and conveys it inwardly to the suction opening. The throwing blade rotates with the conveyor screw and throws up the silage into the overhead conveyor duct, in which the silage is sucked by the material-handling blower, which on its suction side is connected to the conveyor duct and which blows the silage into a forage cart or directly to the feeding places. When the apparatus according to the invention is to be used to load a silo, the sense of rotation of the conveyor screw is reversed so that the material is conveyed outwardly from the center. The throwing blade mounted on the conveyor screw is removed in that case and the propelling and supporting rollers are adjusted in height to increase the spacing of the conveyor screw above the floor. The material fed into the conveyor duct falls onto the floor and is moved outwardly by the conveyor screw, which by each revolution forms a thin layer of material, which is compacted by the heavy weight of the apparatus so that an inclusion of air is very reliably avoided and the production of high-quality silage is ensured. While involving only a small additional expenditure, the design of the apparatus according to the invention enables also a loading of circular silos with high compaction of the material after a very simple alteration.

Within the scope of the invention, the shell which surrounds the conveyor screw may terminate at a distance from the surface of the body of silage on that side which is the leading side in the direction of rotation of the apparatus whereas said shell extends close to the surface of the body of silage on the side which is the trailing side in the direction of rotation. In that embodiment the trailing edge of the shell forms a scraping edge and also ensures that the conveyor screw will move surplus material to areas in which the body of silage has not yet been built up to the scraping level. U.S. Pat. No. 3,653,520 discloses a silo unloader which differs from the unloader according to the invention in that a cover associated with the conveyor screw has lower edges which on the leading and trailing sides are spaced above the surface of the body of silage.

Because the shell on its side which is the leading side in the sense of rotation terminates at a distance above the surface of the body of silage, there will be a slot for the entrance of air when the apparatus according to the invention is used to unload a silo. Also within the scope of the invention, the shell may be provided adjacent to the conveyor tube with a suction opening, the area of which can be adjusted by a gate so that the rate at which material is handled can simply be adjusted to the desired value.

Within the scope of the invention, the radial extent of the throwing blade connected to the shaft of the conveyor screw is desirably as large as the radius of the conveyor screw and the axial extent of said blade is desirably as large as the diameter of the conveyor duct. Besides, the throwing blade may be secured to the shaft of the conveyor screw so as to permit of a radial adjustment of the blade so that the action of the throwing blade can be adjusted to optimum values.

In one embodiment, the conveyor duct may flare at its end near the conveyor screw in known manner and may cover at least part of that end face of the conveyor screw which is disposed near the center of the silo. That embodiment has proved satisfactory in the use of the apparatus according to the invention for unloading and for loading a silo. A particularly high degree of compaction will be obtained if the circular ring-shaped orbits of the supporting rollers are mutually contiguous and the circular ring-shaped orbit of the outermost supporting roller is contiguous to the circular ring-shaped orbit of the drive roller. In that case the body of silage will be compacted throughout its surface in the silo.

In one embodiment of the invention, a propelling roller which is adjustable in height is provided on each side of the conveyor screw and the distance between the propelling rollers is adjustable, e.g., by a linkage which connects the propelling rollers and is adjustable to such a length that the rotating apparatus can be guided by the silo wall.

Within the scope of the invention, an arm may be secured to the linkage which is adjustable in length and said arm may be provided at its free end with a backing roller, which rolls on the silo wall. Said arm may be connected to the shell of the conveyor screw by a strut, which is adjustable in length. The backing roller secured to the arm may be disposed on a higher level than backing rollers which are mounted directly on the shell for the conveyor screw and also roll on the silo wall. If in this embodiment the elevated backing roller is urged toward the conveyor duct, the conveyor screw will be raised from the body of silage or will engage said body on a smaller area. As a result, material is removed from the body of silage always in a horizontal direction. An arm which carries a backing roller that rolls on the silo wall is known per se from U.S. Pat. No. 2,671,696.

Also within the scope of the invention, the propelling rollers may have conical peripheral surfaces and the leading drive roller is advantageously provided on its peripheral surface with anti-slip projections. In connection with silage unloaders of a different type it is known, e.g., from Austrian Pat. No. 238,642 to use conical drive rollers provided with anti-slip projections.

In one embodiment of the apparatus according to the invention, a reversible electric motor is provided to drive the conveyor screw and the means for driving the propelling rollers comprise a transmission which is driven by the electric motor and has two reversible rotary output members. In that case a single electric motor will be sufficient for driving the conveyor screw and the propelling rollers.

The design of the apparatus according to the invention will be particularly simple if the shell for the conveyor screw is provided with reinforcements or stiffening ribs and carries other parts of the apparatus because in that case there will be no need for a separate frame.

Also within the scope of the invention, the conveyor screw may be provided at its radially outer end with a rotary cutter, which at its end face carries a brush, which engages the inside surface of the silo. That rotary cutter disposed outside the end plate of the screw serves as an icebreaker and the brush carried by it removes residual silage which adheres to the silo wall.

Within the scope of the invention the material-handling blower is suitably guided on rails above the silo so that the blower can be moved outwardly beyond the rim of the silo.

To load the silo, material can be supplied to the conveyor duct via a supply duct from a crusher and said supply duct may have an open top end disposed in a feed hopper, which is mounted on the conveyor duct. As an alternative arrangement within the scope of the invention, the material-handling blower may be connected on its delivery side to the conveyor duct by a centrifugal separator when the apparatus is to be used to load a silo and in that case the solids outlet of said cyclone may be connected to the conveyor duct. The change is particularly simple because the materials-handling blower is guided on rails.

Figure 1A:
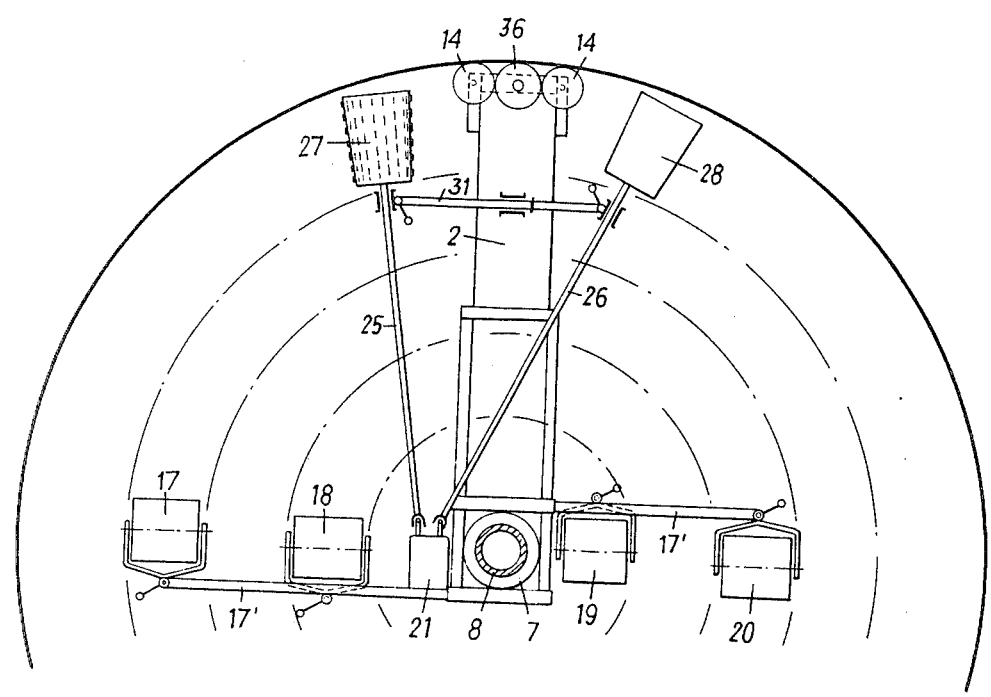
Figure 5:
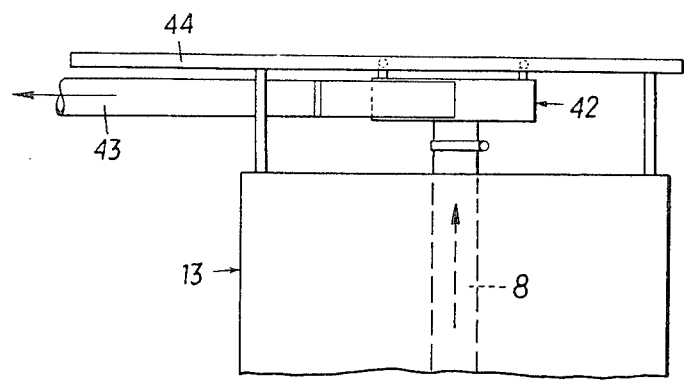
Figure 6:
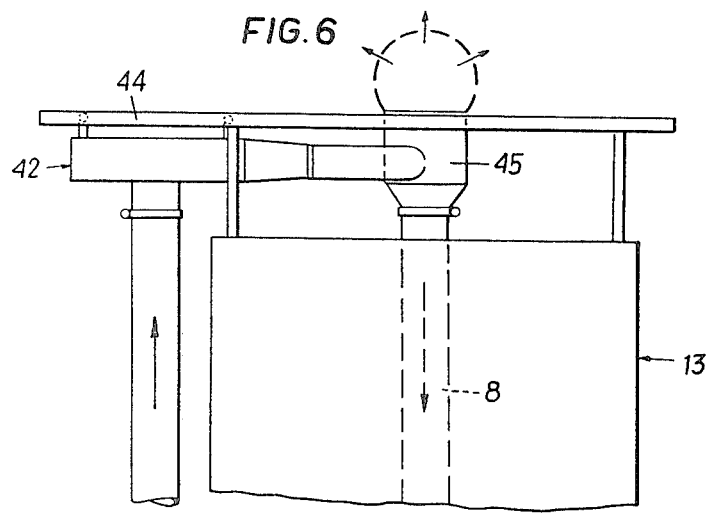
Figure 7:
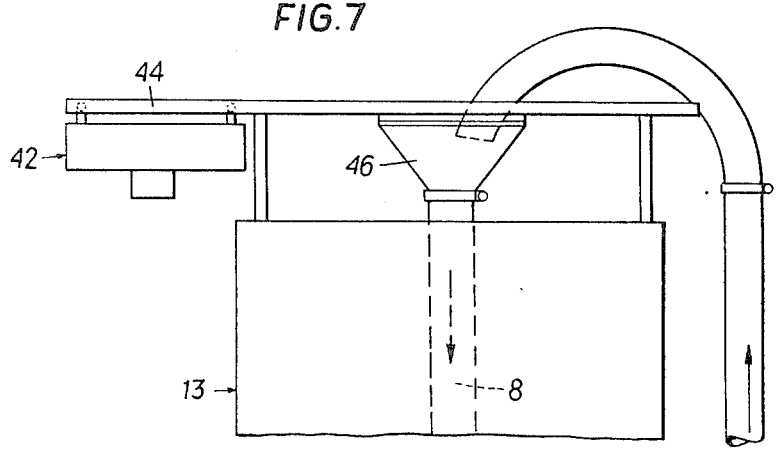

Further advantages and details of the apparatus according to the invention will become apparent from the following description of an embodiment shown by way of example on the accompanying drawings, in which FIGS. 1 and 1a are top plan views showing the apparatus, FIG. 2 is a partly sectional elevational view showing the radially outer end of the apparatus, FIG. 3 is a sectional view taken on line III—III in FIG. 2, FIG. 4 is a sectional side view showing the inner end of the apparatus, FIG. 5 shows the arrangement of the material-handling blower during the unloading of the silo, FIG. 6 shows the arrangement of the material-handling blower during the loading of the silo and FIG. 7 shows another possible arrangement during the loading of the silo.

The apparatus according to the invention comprises a conveyor screw 1, which extends radially with respect to the silo axis and is surrounded by a shell 2, which is self-supporting by being provided with stiffening ribs 3 and 4. At its radially outer end the shell 2 carries an end plate 5 in which the outer end of the shaft 6 of the conveyor screw 1 is rotatably mounted. At its radially inner end, the shaft 6 is rotatably mounted in a depending extension 7 of a conveyor duct 8 and beyond said extension carries a chain sprocket or, as shown by way of example, a belt pulley 9, a V-belt or chain is trained around said belt pulley or chain sprocket and enables the conveyor screw 1 to be driven by a reversible electric motor 10.

Beyond the end plate 5, the shaft 6 at its radially outer end carries a rotary cutter 11, which serves as an icebreaker for breaking up crusts or ice-bonded material from the silo wall 13. A stiff brush 12 is mounted at the outer end of the rotary cutter 11 and serves to remove residual silage adhering to the silo wall 13. The loading and unloading apparatus is backed against the silo wall and the conveyor duct 8 is held in coaxial relation to the silo by two backing rollers 14, which are mounted for rotation on vertical axes at the outer end of the shell 2, and by a backing roller 16, which is mounted on an arm 15 that extends at right angles to the shell 2.

On both sides of the flaring extension by which the conveyor duct 8 is secured to the shell 2, supporting rollers 17, 18 and 19, 20 are mounted on arms 17' and are pivotally movable and adjustable in height.

The electric motor for driving the conveyor screw 1 drives by means of a V-belt or chain drive a transmission 21, which has two rotary output members 22 and 23. By means of a handle 24, the sense of rotation of the output members 22 and 23 of the transmission can be reversed without a change of the sense of rotation of the electric motor 10. By means of universal-joint shafts 25 and 26, the output members 22 and 23 are connected to propelling rollers 27 and 28, which are disposed on opposite sides of the conveyor screw 1. The propelling rollers 27 and 28 preferably have conical peripheries, and the leading propelling roller 27 with respect to the sense of rotation of the apparatus, indicated by the arrow 29, is provided with anti-slip projections 30.

The propelling rollers 27 and 28 are connected to the shell 2 of the conveyor screw 1 by a rod 31, which is adjustable in length, and are adjustable in height relative to the conveyor screw 1 by adjusting means 32 and 33.

The propelling roller 27 which leads the conveyor screw 1 in the direction of rotation is connected to the shell 2 by a connecting rod 34, which determines the distance between the parts 27 and 2.

Between two bearings for the universal-joint shafts 25 and 26, an arm 35 is pivoted to the connecting rod 31 and said arm at its free end carries a backing roller 36, which rolls on the silo wall 13. By a strut 37, which is adjustable in length, the arm 35 is secured to the shell 2 or to lugs secured to said shell.

The distance between the propelling rollers 27 and 28 and the distance of the backing rollers 17, 18, 19 and 20 from the axis of the conveyor duct 8 are so selected relative to each other that the circular ring-shaped orbits described by said rollers during the rotation of the apparatus adjoin so that they cover the entire surface of the silage in the silo.

As is particularly apparent from FIG. 3, the shell 2 of the conveyor screw 1 on its trailing side with respect to the direction of movement indicated by the arrow 29 has an extension which depends toward the surface of the silage. On its leading side said shell is spaced from the surface of the silage to define a gap 38 therewith. When the apparatus is used as an unloader, air can enter through said gap so that silage which has been detached can be sucked off through the conveyor duct 8. In addition, an opening may be provided in the shell 2 near its connection to the conveyor duct 8 and a gate 39 associated with said opening can be used to adjust the cross-section of the opening.

As is apparent from FIG. 4, a throwing blade 40 is secured to the shaft 6 of the conveyor duct 8. The blade 40 may be secured by means of screws 41 or by a clamp fastener, not shown. These fastening means preferably extend through slots so that the throwing blade is radially adjustable. Besides, the throwing blade preferably has an axial extent which is approximately as large as the diameter of the conveyor duct 8, and a radial extent which is approximately as large as the radial extent of the conveyor screw 1. This throwing blade 40 is removed from the shaft 6 of the conveyor screw 1 when the apparatus according to the invention is to be used to load the silo.

As is apparent from FIG. 5, a material-handling blower 42 is connected on its suction side to the top end of the conveyor duct 8, which may be telescopic. On its delivery side, said blower is connected by a duct 43 to a forage cart or feeding place. In the embodiment shown by way of example the suction blower is suspended from and displaceable along rails 44, which are disposed above the silo. Alternatively, the suction blower could be displaceably mounted above the rails.

If detached silage is to be ejected through hatches in the silo wall, the material-handling blower 42 may be disposed a small distance above the conveyor screw.

When the apparatus according to the invention is to be used to load the silo, the electric motor 10 is reversed and the handle 24 is actuated so that the apparatus continues to move in the sense of the arrow 29. A centrifugal separator is then mounted on the top end of the conveyor duct 8. The material-handling blower 42 is displaced on the rails 44 to a position outside the silo and the delivery side of the blower 42 is connected to the inlet of the separator. The charging station is connected by a supply duct to the suction side of the material-handling blower. The material is fed from the material-handling blower 42 to the centrifugal separator 45 and falls down in the conveyor tube 8 and remains confined in the space around the conveyor screw. The propelling rollers and supporting rollers have previously been adjusted to hold the conveyor screw 1 on a somewhat higher level so that the trailing edge of the shell 2 is spaced above the surface of the body of silage. The conveyor screw 1 now moves the entering silage radially outwardly. The trailing edge of the shell 2 acts as a scraping and levelling edge and in conjunction with the conveyor screw ensures a uniform distribution of the material throughout the cross-section of the silo. The propelling and supporting rollers owing to their special arrangement throughout the cross-sectional area of the silo compact and smoothen the material so that a uniform, high compaction is ensured and an inclusion of air is reliably avoided.

FIG. 7 shows additional means for supplying material to the conveyor screw of the apparatus when used for loading. In this case a feed hopper 46 is mounted on the top end of the conveyor duct 8 and a supply duct connected to a crusher or the like opens in said hopper. In that case the suction blower is not needed and remains outside the edge of the silo.

What is claimed is:

1. Apparatus for use in loading and unloading a circular silo, comprising a conveyor duct, a material-handling blower associated with said duct, a horizontal conveyor screw which has an inner end associated with the lower end of said duct and is angularly movable about a main vertical axis extending near said inner end, at least two backing rollers which are rotatable on vertical axes and movable in unison with said conveyor screw about said main vertical axis and are engageable with the inside peripheral surface of a silo to back said conveyor screw, horizontal carrying arms connected to said conveyor screw to move in unison therewith about said main vertical axis and extending from said conveyor screw on opposite sides thereof substantially at right angles to the axis of said screw, supporting rollers which are carried by and pivotally connected to said carrying arms and individually adjustable in height relative to said carrying arms and are disposed on opposite sides of said duct at different radial distances from said main vertical axis and rotatable on horizontal axes which are substantially at right angles to the axis of said conveyor screw, propelling roller means comprising at least one propelling roller which is rotatable on a horizontal axis to move said conveyor screw about said main vertical axis, the radial distances and the radial extents of said supporting rollers and said propelling roller means being such that the circular ring-shaped orbits described by said rollers and roller means during the rotation of the apparatus adjoin so that they cover substantially the entire surface of the silage in the silo, a throwing blade detachably connected to said conveyor screw for rotation therewith at said inner end thereof and associated with said lower end of said duct, propelling drive means for operating said propelling roller means to move said conveyor screw about said main vertical axis in a predetermined sense, and reversible drive means for rotating said conveyor screw about its axis selectively in one sense and the other.

2. Apparatus as set forth in claim 1, in which said throwing blade is connected to said conveyor screw by screw-threaded fastening means.

3. Apparatus as set forth in claim 1, in which said throwing-blade is connected to said conveyor screw by quickly operable fastening means.

4. Apparatus as set forth in claim 1, in which said conveyor screw is covered at its top and on its sides by a shell, which is open at the bottom and with respect to said predetermined sense has a horizontal leading side edge and a horizontal trailing side edge disposed below said leading side edge.

5. Apparatus as set forth in claim 4, in which said supporting rollers are adapted to support said conveyor screw on a body of silage in a silo in a position in which said leading side edge is substantially spaced above the surface of said body of silage and said trailing side edge is in close proximity to said surface.

6. Apparatus as set forth in claim 1, in which
said conveyor screw is covered at its top and on its sides by a shell, which is open at the bottom and is provided adjacent to said duct with a suction opening and
said shell is provided with a gate, which is slidable to adjust the open area of said opening.

7. Apparatus as set forth in claim 1, in which said throwing blade is vertically aligned with said lower end of said duct and has a radius which is substantially as large as the radius of said conveyor screw and an axial extent which is substantially as large as the inside diameter of said duct.

8. Apparatus as set forth in claim 7, in which said duct has a downwardly flaring lower edge portion which covers at least part of said conveyor screw for rotation therewith.

9. Apparatus as set forth in claim 1, in which said supporting rollers comprise a radially outermost supporting roller and are arranged to describe during said movement about said main vertical axis mutually contiguous circular ring-shaped orbits and said propelling roller is arranged to describe during said movement about said main vertical axis a circular ring-shaped orbit which is contiguous to the circular ring-shaped orbit described by said radially outermost supporting roller.

10. Apparatus as set forth in claim 1, in which
said propelling roller means comprise two propelling rollers disposed on opposite sides of said conveyor screw and adjustable in height relative thereto and
said propelling rollers are spaced by an adjustable distance.

11. Apparatus as set forth in claim 10, which comprises a rod, which connects said propelling rollers and is adjustable in length to adjust said distance.

12. Apparatus as set forth in claim 11, in which
said conveyor screw is covered at its top and on its sides by a shell, which is open at the bottom,
a horizontal mounting arm is pivoted to said rod on the axis thereof and has a free outer end and is connected to said shell by a strut, which is adjustable in length
one of said backing rollers is mounted on said mounting arm at said outer end thereof, and
additional ones of said backing rollers are mounted directly on said shell below said one backing roller.

13. Apparatus as set forth in claim 1 in which said propelling roller means comprise at least one propelling roller having a conical peripheral surface.

14. Apparatus as set forth in claim 1, in which
said propelling roller means comprise two propelling rollers, which are angularly spaced apart with respect to said main vertical axis and
one of said propelling rollers leads the other during said movement about said main vertical axis in said predetermined sense and is formed with anti-slip projections.

15. Apparatus as set forth in claim 1, in which
said reversible drive means comprise a reversible electric motor and
said propelling drive means comprise a transmission which is connected between said electric motor and said propelling roller means and comprises a reversible rotary output member connected to said propelling roller.

16. Apparatus as set forth in claim 15, in which
said propelling roller means comprise a plurality of propelling rollers and
said transmission comprises a plurality of reversible rotary output members connected to respective ones of said propelling rollers.

17. Apparatus as set forth in claim 1, in which
said conveyor screw is covered at its top and on its sides by a shell, which is open at the bottom and carries other parts of the apparatus.

18. Apparatus as set forth in claim 17, in which said shell is provided with reinforcing means.

19. Apparatus as set forth in claim 17, in which said shell is provided with stiffening ribs.

20. Apparatus as set forth in claim 1, in which
a rotary cutter is coaxially and mounted on said conveyor screw for rotation therewith at its radially outer end and
a brush engageable with the inside peripheral surface of said silo is carried by said rotary cutter on its outer end face.

21. Apparatus as set forth in claim 1, which is arranged for loading a silo, in which
said material-handling blower is connected on its delivery side to a centrifugal separator having a solids outlet, which is connected to said duct.

22. Apparatus as set forth in claim 1, in which said conveyor screw has a shaft, and said throwing blade is adjustably mounted on said shaft for adjustment radially of said shaft.

23. A silo installation comprising
a silo having a cylindrical silo wall, which has a top rim,
rails extending across said top rim above the same, and
apparatus for use in loading and unloading said silo, said apparatus comprising
a conveyor duct,
a material-handling blower associated with said duct and carried by and movable along said rails,
a horizontal conveyor screw which has an inner end disposed at the center of said silo and associated with the lower end of said duct and is movable about a main vertical axis extending near said inner end,
at least two backing rollers which are rotatable on vertical axes and movable in unison with said conveyor screw about said main vertical axis and which engage the inside peripheral surface of said silo wall to back said conveyor screw, horizontal carrying arms connected to said conveyor screw to move in unison therewith about said main vertical axis and extending from said conveyor screw on opposite sides thereof substantially at right angles to the axis of said screw, supporting rollers which are rotatable on horizontal axes and disposed on opposite sides of said duct and carried by and pivotally connected to said arms and individually adjustable in height relative to said arms, propelling roller means which comprise at least one propelling roller which is rotatable on a horizontal axis to move said conveyor screw about said main vertical axis, the radial distances and the radial extents of said supporting rollers and said propelling roller means being such that the circular ring-shaped orbits described by said rollers and roller means during the rotation of the apparatus adjoin so that they cover substantially the entire surface of the silage in the silo, a throwing blade detachably connected to said conveyor screw for rotation therewith at said inner end thereof and associated with said lower end of said duct, propelling drive means for operating said propelling roller means to move said conveyor screw about said main vertical axis in a predetermined sense, and reversible drive means for rotating said conveyor screw about its axis selectively in one sense and the other.

* * * * *